United States Patent [19]
Maurice

[11] 3,933,226
[45] Jan. 20, 1976

[54] DISC BRAKE MOUNTING STRUCTURE

[75] Inventor: Jean Maurice, Paris, France

[73] Assignee: Societe Anonyme Francaise du Ferodo, Paris, France

[22] Filed: Apr. 15, 1974

[21] Appl. No.: 461,127

Related U.S. Application Data

[63] Continuation of Ser. No. 53,346, July 9, 1970, abandoned.

[30] Foreign Application Priority Data

July 11, 1969 France .............................. 69.23672
Aug. 7, 1969 France .............................. 69.27122
Mar. 27, 1970 France .............................. 70.11110

[52] U.S. Cl. .............. 188/72.5; 188/73.4; 188/73.5
[51] Int. Cl.² ....................................... F16D 55/228
[58] Field of Search ....... 188/72.5, 23.4, 23.5, 23.3, 188/205 A

[56] References Cited
UNITED STATES PATENTS

| | | | |
|---|---|---|---|
| 3,416,634 | 12/1968 | Swift | 188/73.3 |
| 3,421,602 | 1/1969 | Craske | 188/73.4 |
| 3,493,084 | 2/1970 | Maurice | 188/72.5 |

*Primary Examiner*—George E. A. Halvosa
*Attorney, Agent, or Firm*—Young & Thompson

[57] ABSTRACT

A disc-brake of the kind comprising a bracket-shaped fixed support, a rotating disc rigidly fixed to the member to be braked, two brake-shoes movably mounted perpendicular to the plane of the disc and on each side of this latter, an operating unit and a transfer member movable perpendicularly to the plane of the disc, the operating unit acting directly on a first of the brake-shoes and on the second brake-shoe through the intermediary of the transfer member, the fixed support comprising a side-plate parallel to the plane of the disc and a return member perpendicular to the plane of the disc and facing the edge of this latter. The side-plate comprising, facing the operating unit, a housing for the first brake-shoe, the second brake-shoe comprising two extensions co-operating in abutment with the return member, the operating unit comprises a cylinder in which two pistons are mounted to slide in opposite directions, one of the pistons acting on the first brake-shoe and the other on the transfer member, this latter being constituted by a ring surrounding the fixed support, the operating unit, the brake-shoes and part of the disc.

11 Claims, 15 Drawing Figures

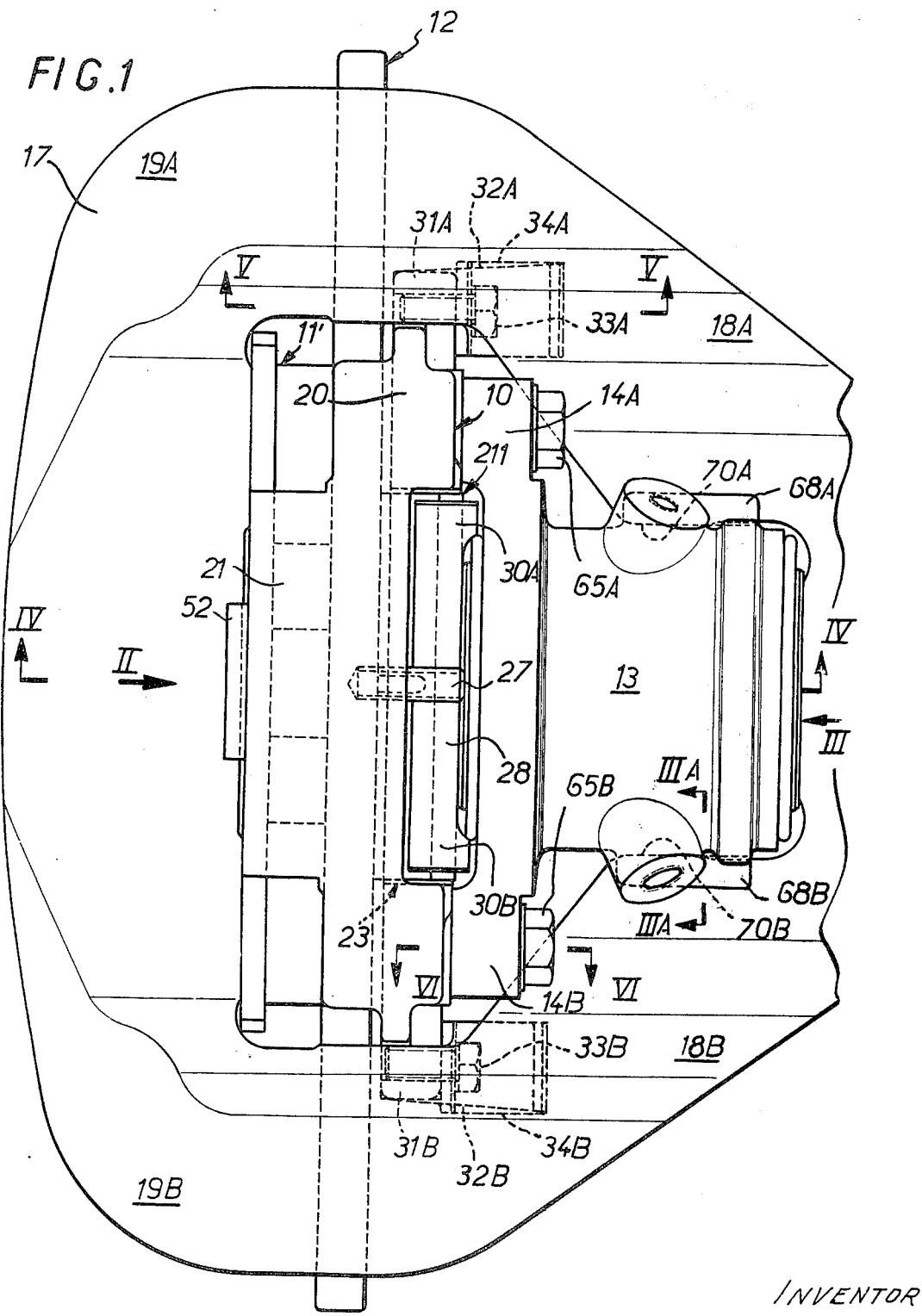

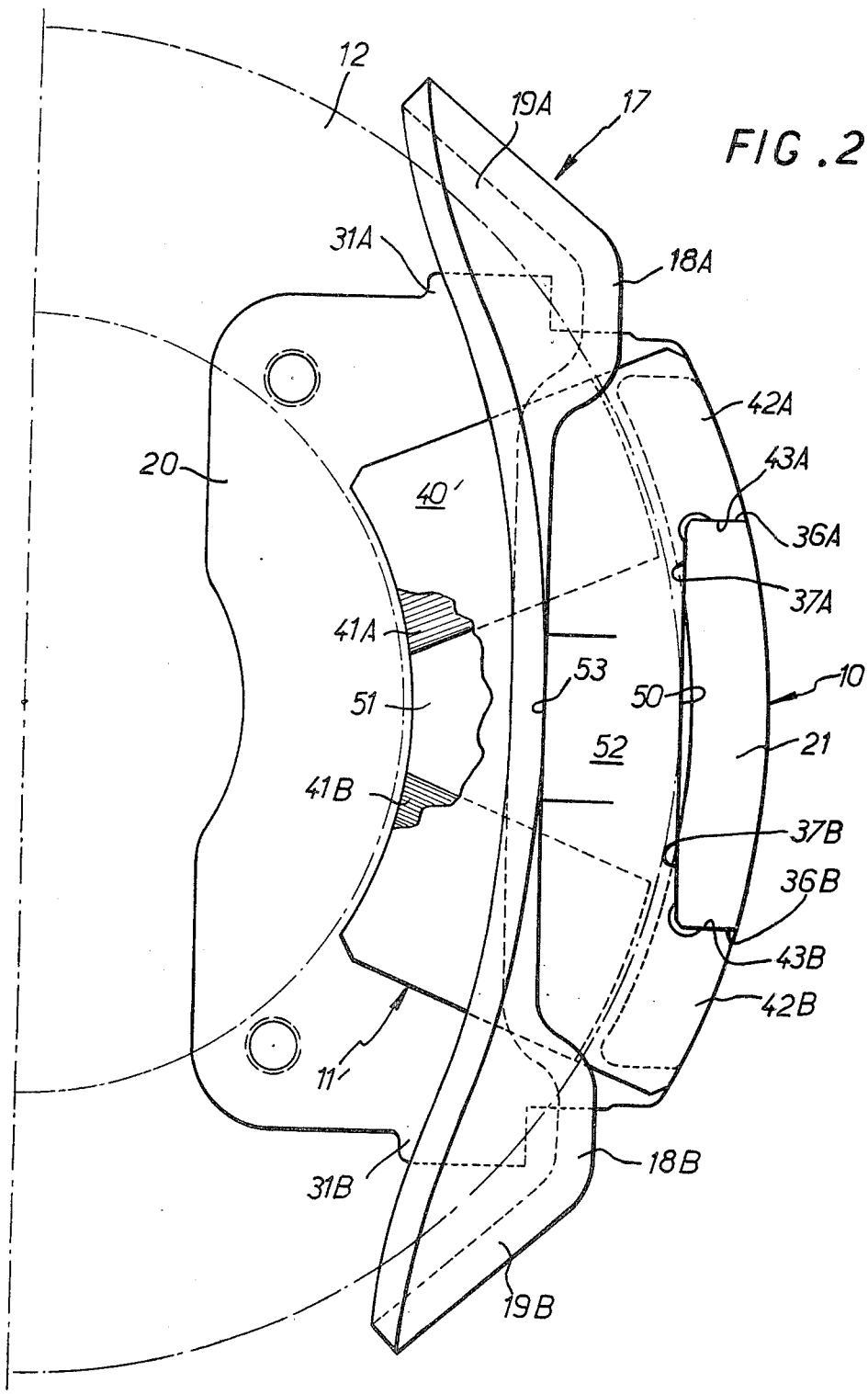

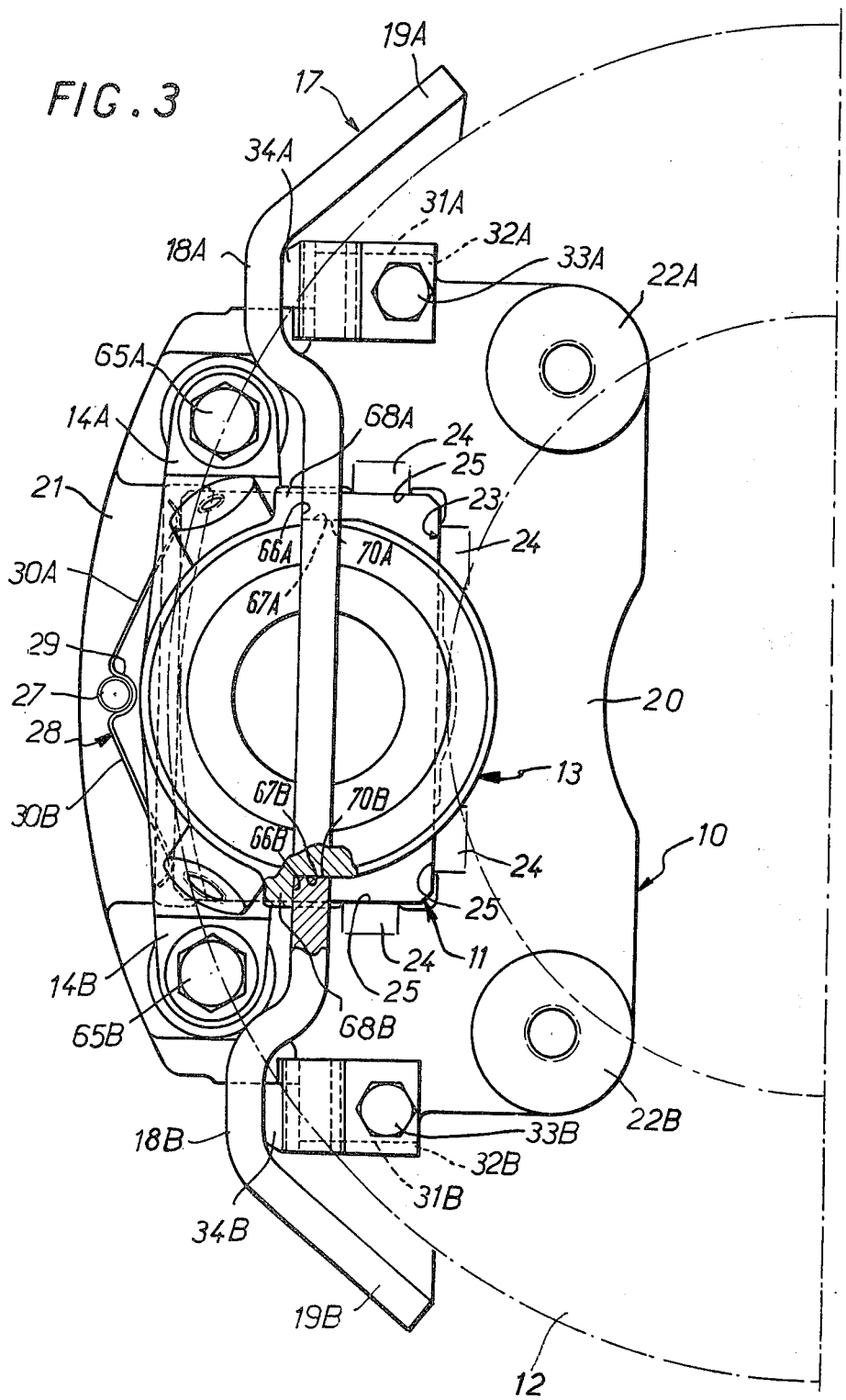

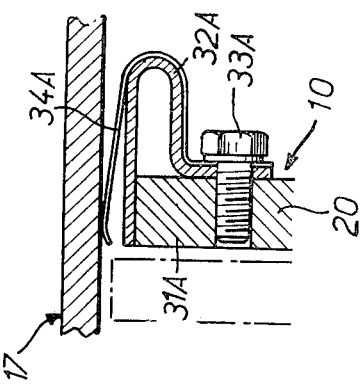
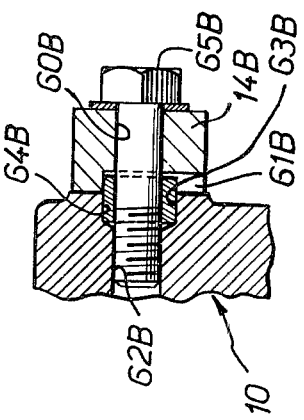
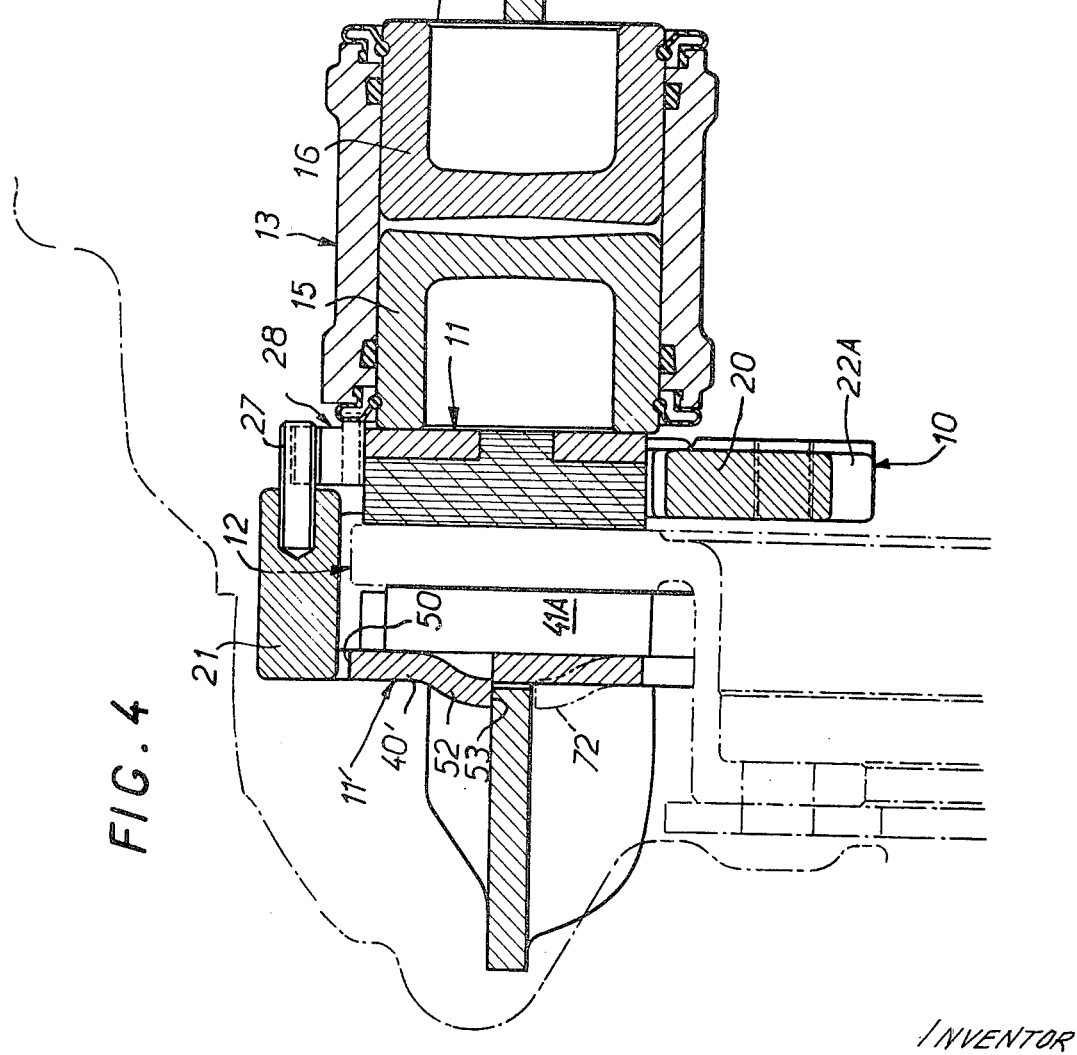

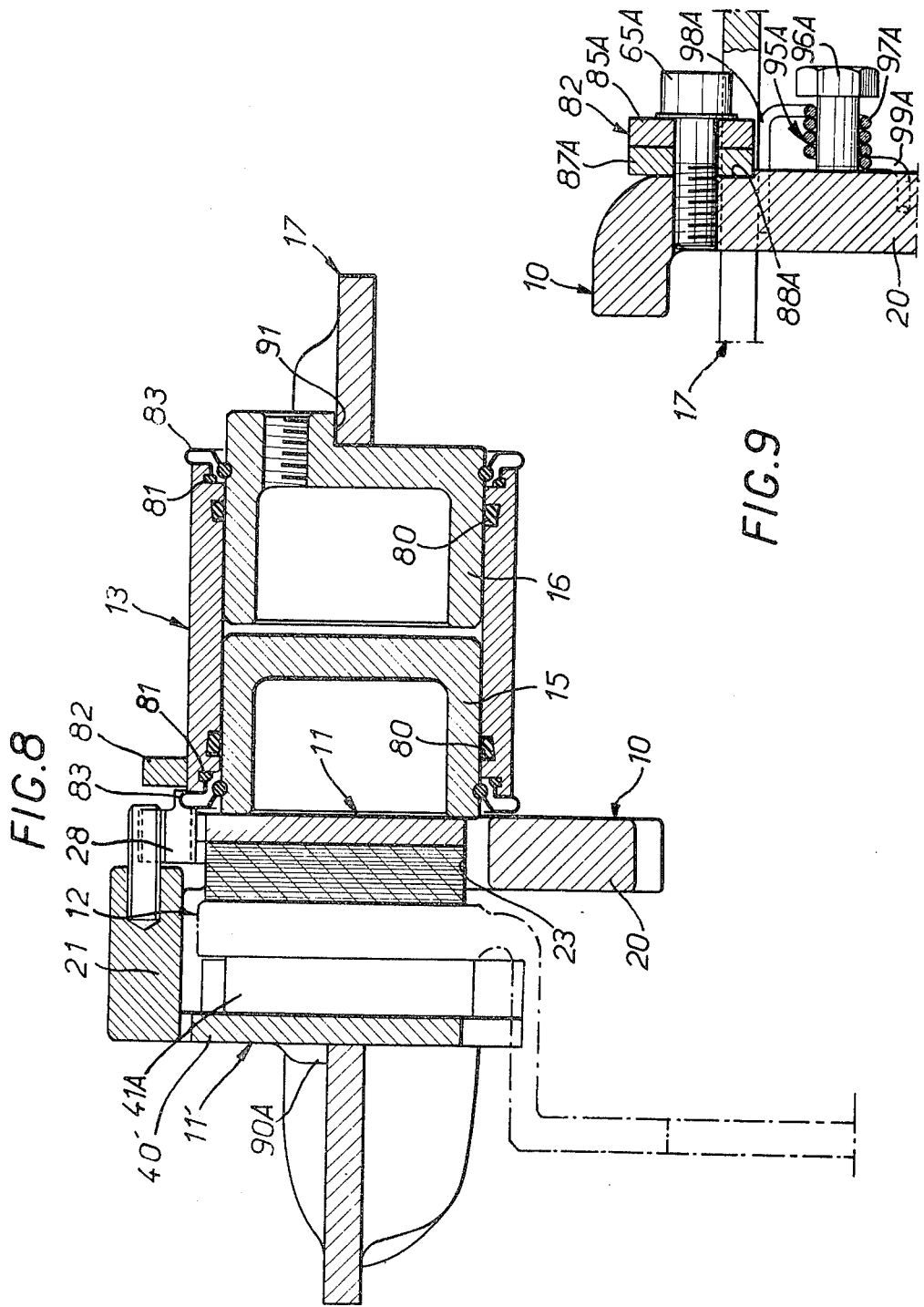

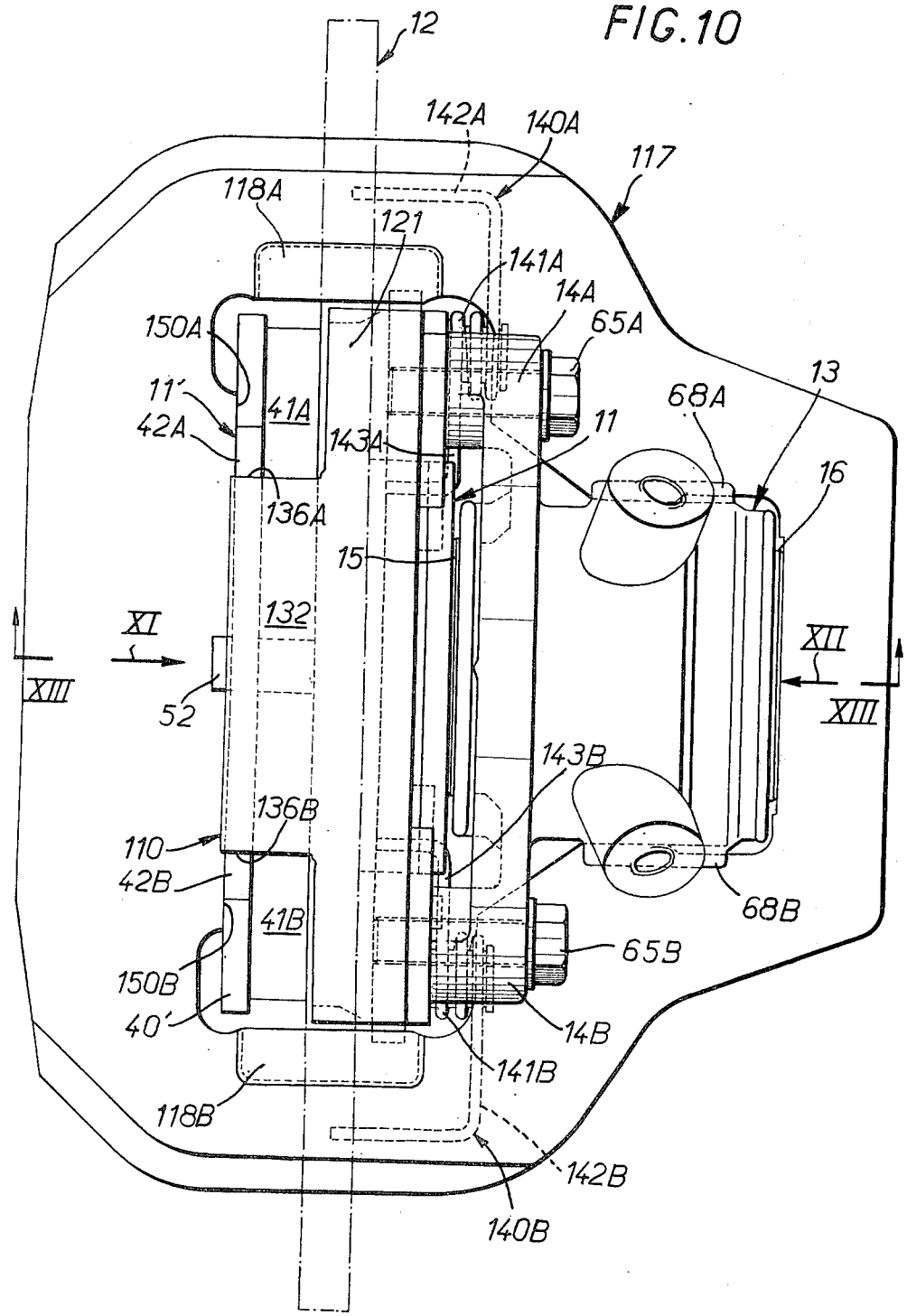

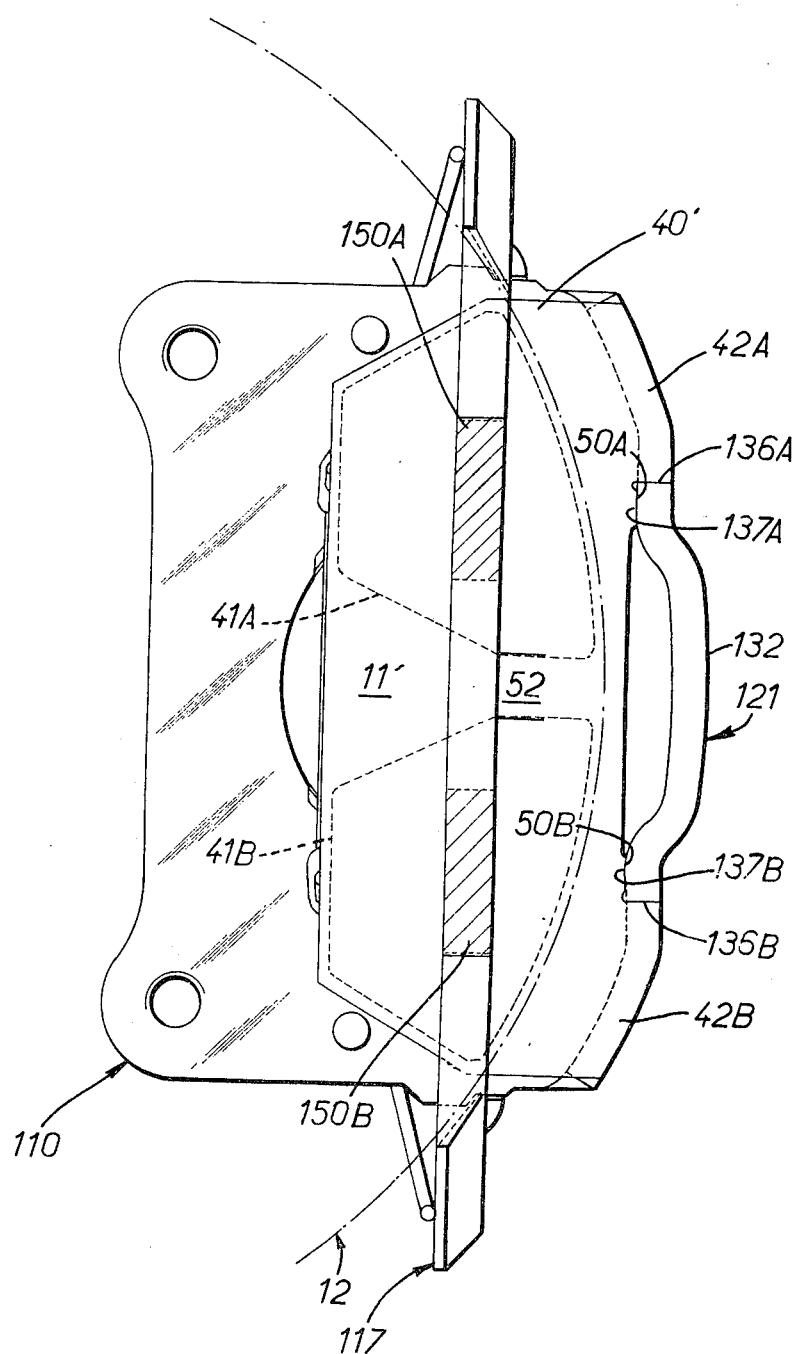

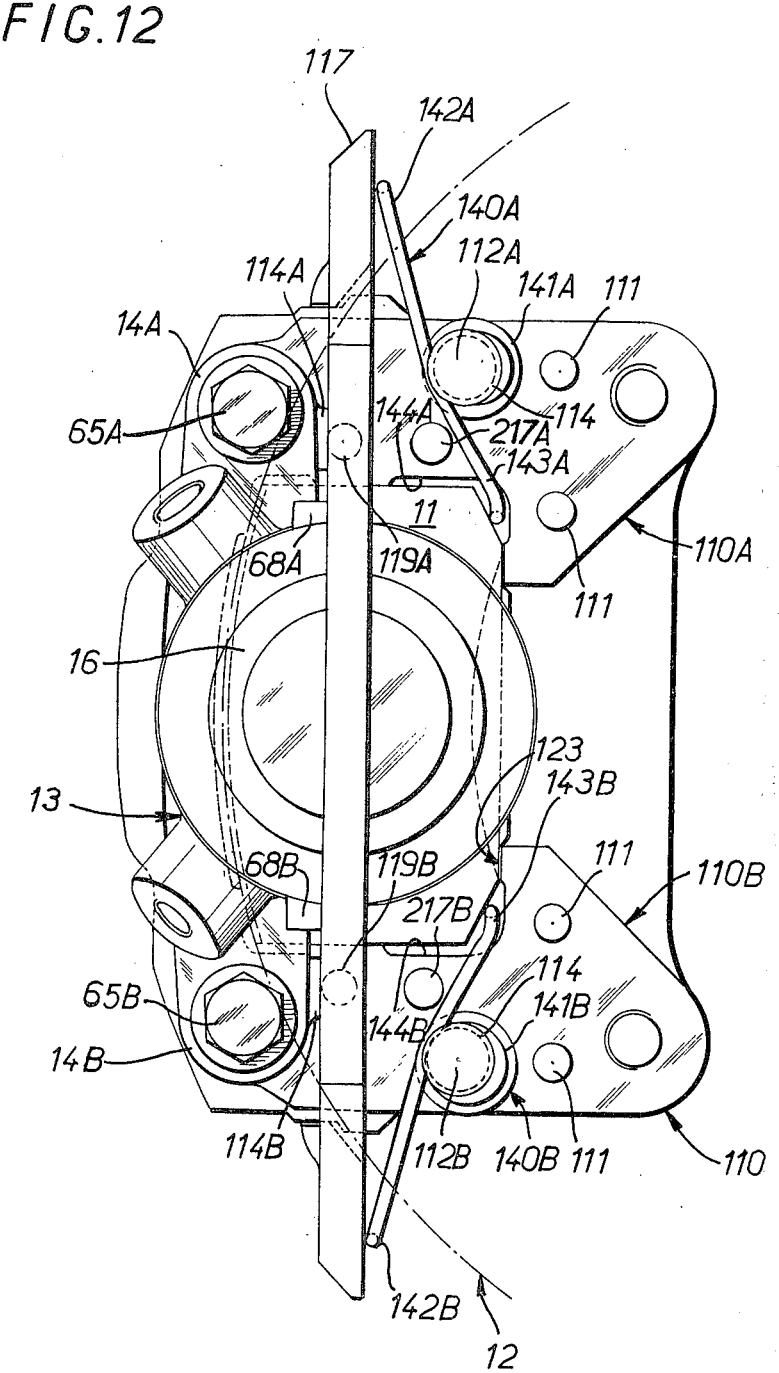

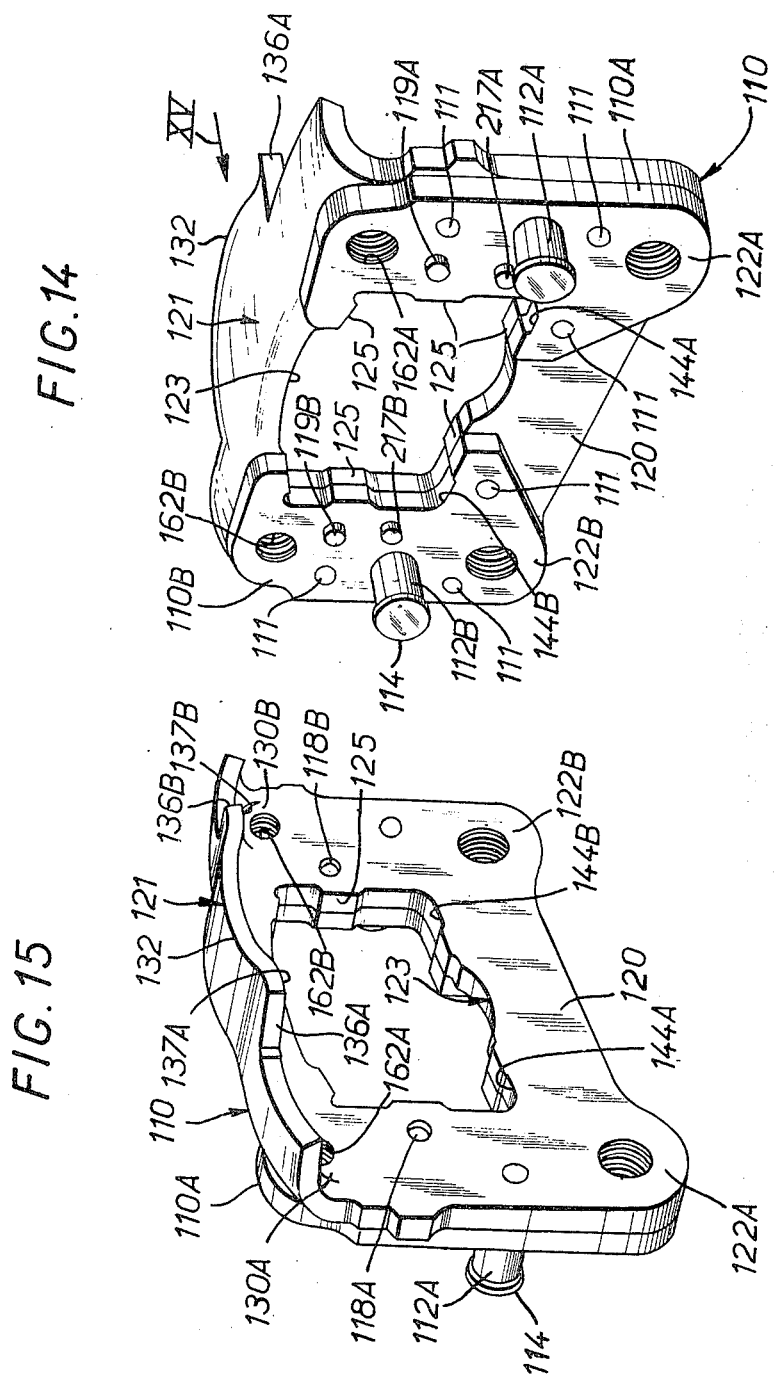

DISC BRAKE MOUNTING STRUCTURE

This is a continuation of application Ser. No. 53,346, filed July 9, 1970, now abandoned.

The present invention relates to disc brakes of the kind which generally comprises a fixed support, a rotating disc rigidly fixed to the member to be braked, two brake shoes movably mounted perpendicular to the plane of the disc and on each side of this latter, an operating unit and a transfer member, the said operating unit acting on a first of the said brake-shoes directly and on the second of the said brake-shoes through the intermediary of the said transfer member.

In known brakes of this kind, the fixed support has most frequently more or less complex forms, a U-shaped mamber for example, which are costly to produce and which cannot always be readily given the full rigidity desirable at all points. The reason for this is generally that this fixed support ensures itself the guiding of the two brake-shoes perpendicularly to the disc, which in most cases makes it necessary to provide this fixed support with notches or windows serving as housings for the said shoes.

One of the objects of the present invention is to provide the possibility of utilizing a fixed support which is as compact, solid and rigid as may be desired.

In the brake according to the invention, this fixed support is in the form of a bracket.

Thus, in its first aspect, the present invention has for its object a disc-brake of the kind comprising a fixed support in the form of a bracket, a rotating disc rigidly fixed to the member to be braked, two brake-shoes movably mounted perpendicular to the plane of the disc, on each side of this latter, an operating unit and a transfer member movable perpendicularly to the plane of the disc, the said operating unit acting on a first of the said brake-shoes directly and on the second of the said brake-shoes through the intermediary of the said transfer member, characterized in that the fixed support in the form of a bracket comprises a side-plate parallel to the plane of the disc and a return member perpendicular to the plane of the disc, facing the edge of this latter, the said side-plate comprising a housing facing the operating unit for the first brake-shoe, adapted to immobilize it both circumferentially in both directions of rotation of the disc and radially in at least one of these two directions, and the said return member comprising on the one hand at least one longitudinal support abutment for the radial support of the second brake-shoe with respect to the disc, that is to say for supporting this shoe in a radial direction of the said disc, and on the other hand at least two transverse support abutments for supporting the said second brake-shoe circumferentially in both directions of rotation of the said disc, the said transverse support abutments being formed at the transverse extremities of the said return member; in that the second brake-shoe has two lateral extensions which enclose the said return member and co-operate with the said abutments; in that the operating unit comprises a cylinder and two pistons sliding in opposite directions in the said cylinder, one acting on the first brake-shoe and the other acting on the transfer member; and in that the said transfer member is a ring which surrounds the fixed support, the operating unit, the brake-shoes and part of the disc.

It is of course known to make supports in the form of a bracket, the return member of which has two transverse support abutments. However, in the known constructions of this type, these abutments are opposite each other, being carried by two lateral extensions of the return member of the support, separate from each other. The result is that the general structure of such a support is much less compact than that of the support according to the invention, and in consequence it does not offer sufficient rigidity to be manufactured of sheet steel, unless it is given a complicated shape in order to ensure stiffening.

On the other hand, the bracket-shaped support with a single return member of the brake according to the invention has all the rigidity which may be desired.

The fact that the radial support of the second brake-shoe is effected conjointly by the transfer member and the fixed support also facilitates the adoption, according to the invention, of an original advantageous arrangement, in which elastic means being interposed between the said fixed support and the said transfer member, the said elastic means act on the transfer member in a radial direction of the disc to be braked, going from the axis of this disc to its periphery.

This arrangement facilitates the dismantling operations necessary in changing the brake-shoes, and further permits of economy in the elastic means which are usually provided between a brake-shoe and the fixed support, especially for the purpose of absorbing assembly clearances, and to act in opposition to possible vibrations. The function of these elastic means is effected through the intermediary of the transfer member by the elastic means, which are interposed between this member and the fixed support.

Thus, according to a further aspect, the present invention has also for its object a disc brake of the kind referred to, characterized in that, for its support parallel to a radial direction of the disc, at least one of the brake-shoes comprises two opposite supporting surfaces, one for co-operating with the transfer member and the other for co-operation with the longitudinal supporting surface formed on the fixed support, and in that elastic means are interposed between the transfer member and the fixed support which urge the said transfer member in a direction going from the axis of the disc to the periphery of the disc.

In a particular form of construction, the bracket-shaped support of the brake according to the invention carries two supporting members on each side of the housing of the first brake-shoe, for the support of elastic torsion means interposed between the said first brake-shoe and the transfer member.

This arrangement advantageously makes it possible to obtain, with the same elastic means, both an elastic retention of the first brake-shoe in its housing and an elastic application of the transfer member against its various supporting points. In addition, when the transfer member assists in the radial support of the second shoe, these same elastic means simultaneously ensure the elastic retention of this second shoe.

In consequence, this arrangement leads to particularly economical constructions.

The present invention has also for its objects various improvements made in brakes of this type.

According to one of these improvements: radial supporting surfaces being associated with the transfer member so as to retain this member radially, at least in one direction, these supporting surfaces are all movable perpendicularly to the plane of the disc.

This arrangement has a two-fold advantage: on the one hand these radial supporting surfaces are thus able, during the course of braking, to follow without friction the movements of the transfer member perpendicularly to the plane of the disc, which correspondingly diminishes the internal friction of the brake; and on the other hand, these supporting surfaces are removed from the operating unit, which is fixed, and in consequence the latter is able, according to a preferred form of construction, to have the very light and economical form of a simple section of tube, the corresponding supporting surface being fixed on one of the pistons which are slidably mounted in the usual manner in the said operating unit.

The objects of the invention, their characteristic features and advantages, will furthermore be brought out in the description which follows below by way of example, reference being made to the accompanying diagrammatic drawings, in which:

FIG. 1 is a partial plan view of a disc-brake in accordance with the invention:

FIG. 2 is a side view of this brake in the direction of the arrow II of FIG. 1 with parts broken away;

FIG. 3 is a side view in the direction of the arrow III of FIG. 1, with a local cross-section taken along the line IIIA—IIIA of FIG. 1;

FIGS. 4, 5 and 6 are views in cross-section, some of them partial, taken respectively along the lines IV—IV, V—V, and VI—VI of FIG. 1;

FIG. 8 is a view in cross-section of this alternative form taken along the broken line VIII—VIII of FIG. 7;

FIG. 9 is a further view in partial cross-section of this alternative, taken along the line IX—IX of FIG. 7;

FIGS. 10, 11, 12 and 13 are views respectively similar to FIGS. 1, 2, 3 and 4, and relate to a further alternative form of construction;

FIG. 14 is a view in perspective of the single support provided in this alternative form of construction;

FIG. 15 is another perspective view of this support looking in the direction of the arrow XV of FIG. 14.

Figure 7:
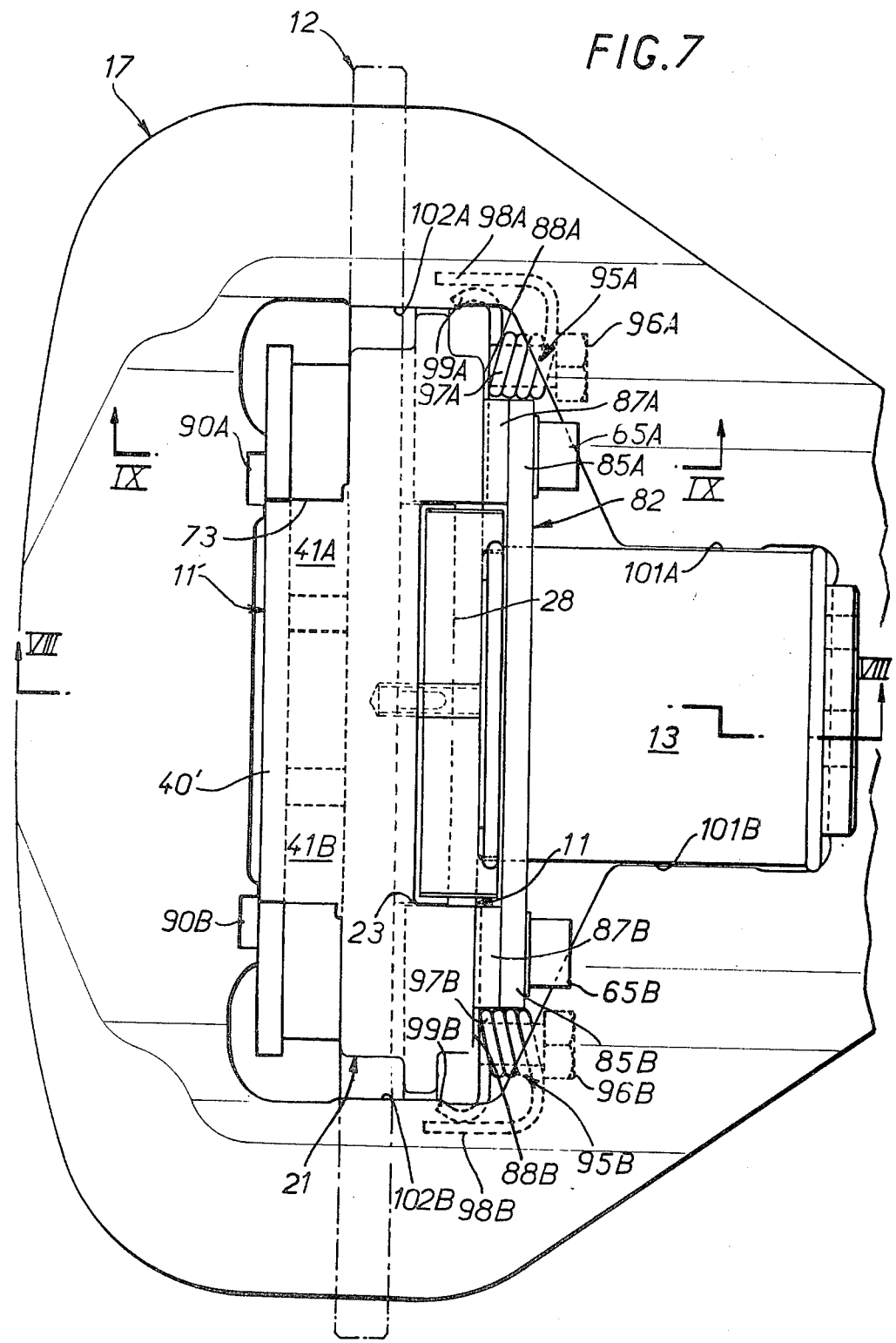
FIG. 7 is a similar view and relates to an alternative form of construction.
Figure 13:
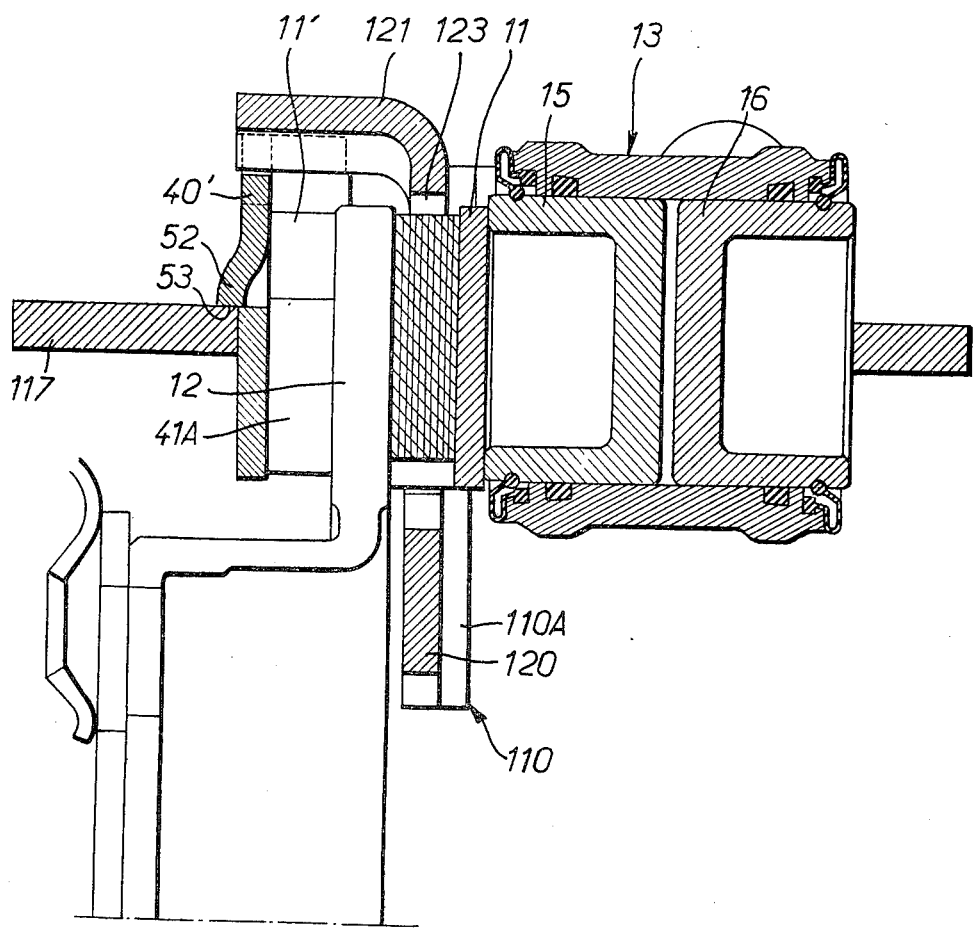

According to the form of construction shown in FIGS. 1 to 6, a disc-brake according to the invention, especially intended for automobile vehicles and all other applications, comprises: a fixed support 10; two brake-shoes 11, 11' on each side of a disc 12 rigidly fixed on the wheel to be braked; an operating unit 13 which is provided laterally with two lugs 14A, 14B for its removable fixing on the support 10, as described below, and which is formed with a bore (FIG. 4) in which two pistons 15, 16 are slidably mounted to move in opposite directions; and an annular transfer member or ring 17 which extends perpendicularly to the plane of the disc 12 round the operating unit 13, the support 10 and the brake-shoes 11, 11', this ring being provided with two corrugations 18A, 18B, the generator lines of which are perpendicular to the plane of the disc, and which is provided at its periphery with folded back portions 19A, 19B, enclosing the disc laterally. The piston 15 bears against the brake-shoe 11, while the piston 16 bears against the ring 17 which is in turn intended to bear against the brake-shoe 11' (FIGS. 1 and 4).

The fixed support which is moulded in the example shown, is a member in the form of a bracket, comprising a side-plate 20 parallel to the plane of the disc 12, and a return member 21 perpendicular to the side-plate 20 facing the periphery of the said disc.

The side-plate 20 which is arranged on the same side of the disc as the operating unit 13, is provided at its lower portion with two fixing lugs 22A, 22B.

This side-plate 20 is pierced, facing the operating unit 13, with a window 23 serving as a housing for the brake-shoe 11.

The periphery of this window is edged here and there by reinforcing ribs 24 (FIG. 3) projecting into the window 23 so as to form bearing surfaces 25 against which the brake-shoe 11 is supported.

The window 23 of the side-plate 20 is also associated with the return member 21 coupled to this plate. Directly above the shoe 11, this return member carries a pim 27, elastic means being interposed between this pin 27 and the shoe 11 (FIGS. 1 and 3). According to the form of construction shown, these elastic means comprise an elastic blade 28 having a central dished portion 29 supported against the pin 27, and two lateral arms 30A, 30B, the curved-back extremities of which are supported against the corresponding edge of the brake-shoe 11.

Laterally, on each side of the window 23, the side-plate 20 of the fixed support 10 is provided with two projections 31A, 31B respectively (as shown in FIGS. 2, 3 and 5). On these projections 31A, 31B, are respectively fixed brackets 32A, 32B which are held by screws 33A, 33B and which serve for the articulation of spring blades 34A, 34B applying a thrust on the ring 17. As will be observed, this thrust applied by the springs on the ring 17 tends to disengage this ring with respect to the disc 12, that is to say it is directed substantially along a direction from the inside of the disc 12 to the periphery of this disc.

According to the form of construction shown in FIGS. 1 to 4, and more particularly shown in FIG. 2, the return member 21 of the fixed support 10 is provided laterally with two transverse supporting abutments 36A, 36B at its two extremities, and two longitudinal supporting abutments 37A, 37B, on that of its faces which is opposite the ring 17 (see FIG. 2).

At the same time, the metal plate 40' which supports the friction lining of the brake-shoe 11', which will be explained later, is provided laterally with two extensions 42A, 42B which enclose the return member 21 of the fixed support 10. These extensions 42A, 42B form supporting surfaces 43A, 43B respectively which face each other and co-operate respectively with the transverse supporting abutments 36A, 36B of the return 21 of the support 10. In addition, between these extensions 42A, 42B, the metal plate 40' of the brake-shoe 11' forms a supporting surface 50 which co-operates with the longitudinal supporting abutments 37A, 37B, of the said return member 21.

This arrangement gives a considerable development to the brake-shoe 11' which is thus no longer confined in a window of any kind.

According to the invention, provision is made, as shown, for taking advantage of this possible development in order to divide the friction lining of this shoe 11' into two parts 41A, 41B arranged on each side of a free ventilation space 51.

In the plate 40' of the brake-shoe 11' is cut-out a tongue 52, and this tongue is bent-back, as shown in FIG. 4, so that its free edge 53 bears against the transfer ring 17.

By reason of the elastic pressure applied on this ring 17 by the springs 34A, 34B, the brake-shoe 11' is held elastically applied, by its supporting surface 50, against the longitudinal supporting abutments 37A, 37B of the return member 21 of the fixed support 10. This shoe is thus held radially between two supporting surfaces facing each other, one formed on the return member 21 of the fixed support 10 and the other formed on the transfer ring 17.

As has been seen above, the operating unit 13 is provided with two lateral lugs 14A, 14B for its fixing on the side-plate 20 of the support 10. These lugs are parallel to the side-plate 20 of the support 10. As can be seen from FIG. 6 for the single lug 14B, the bore 60B formed in this lug is extended laterally by a recess 61B on that face of the said lug which is intended to come into contact with the side-plate 20 of the support 10. conjointly, the support 10 is formed with a threaded bore 62B opening to the exterior by a pilot hole 63B in which is partly engaged a centering sleeve 64B.

A similar arrangement is adopted for the lug 14A of the operating unit 13 (not shown on the drawings).

As will be readily understood, the recesses of these lugs, such as the recess 61B described above, permits direct engagement of the operating unit 13 parallel to the plane of the disc 12 on the centering sleeves such as the sleeve 64B described above, carried by the side-plate 20 of the support 10. This arrangement permits the placing in position without trial and error of the screws 65A, 65B which are intended to provide the fixing of the operating unit 13 on the support 10.

At its rear part, the operating unit 13 is provided on each side with right-angle bearing faces 66A, 66B and 67A, 67B respectively, which are each perpendicular to the plane of the disc 12, the bearing surfaces 66A, 66B forming the lower face of longitudinal beads 68A, 68B provided laterally on the operating unit 13.

As has been seen, the transfer ring 17 rests on the springs 34A, 34B carried by the fixed support 10, and it is engaged under the tongue 52 of the brake-shoe 11'. As shown in FIGS. 1 and 3, it is also engaged under the longitudinal beads 68A, 68B of the operating unit 13, so that the bearing surfaces 66A, 66B of these beads ensure its radial retention while at the same time the bearing surfaces 67A, 67B of these beads ensure correct guiding perpendicular to the plane of the disc. For this guiding action, the ring 17 has straight edges 70A, 70B in contact with the surfaces 67A, 67B of the operating unit 13.

Thus the transfer ring 17 is held on one of its faces by the springs 34A, 34B and on the other of its faces by the bearing surfaces 66A, 66B of the operating unit 13, and by the tongue 52 of the brake-shoe 11'. It transmits to the brake-shoe 11' the elastic force which is applied to it by the springs 34B, 34B for the contact of the said shoe with the return member 21 of the fixed support 10.

The operation of the brake described is as follows:

When a braking pressure is sent into the hydraulic circuit (not shown) to which the operating unit 13 is connected, this pressure is applied directly to the brake-shoe 11 by the piston 15, while the force applied by the piston 16 on the transfer ring 17 causes the displacement of this latter perpendicularly to the disc 12, and in consequence the transmission of this force to the brake-shoe 11'. The disc 12 is thus gripped locally between the brake-shoes 11, 11'.

When the braking pressure is removed, the disc 12 is released.

As regards the changing of the brake-shoes 11, 11' after their linings are worn, this can be very rapidly and easily effected in the following manner: the operating unit 13 is removed from the support 10 by unscrewing and removing the screws 65A, 65B and the operating unit 13 is withdrawn parallel to the plane of the disc 12, without it being necessary to disconnect the hydraulic circuit associated with the said operating unit. Access to the brake-shoe 11 is thus obtained, and in order to have access to the brake-shoe 11', it is then only necessary to push back the transfer ring 17 until this ring escapes from the tongue 52 of the said brake-shoe.

The re-assembly of these various parts is carried out just as easily. It has been seen in particular that the placing in position of the operating unit 13 was facilitated by the fact that its lugs 14A, 14B comprise lateral recesses which permit its direct engagement on the centering sleeves carried by the support 10. This engagement is effected after having placed the transfer ring 17 on the springs 34A, 34B, this ring supporting in turn the brake-shoe 11'. This engagement is thus effected against the force of the springs 34A, 34B which must be slightly compressed.

In order to facilitate the placing in position of the brake-shoe 11', according to an alternative form of construction indicated by a broken line in FIG. 4, there is associated with the tongue 52 of this brake-shoe a similar tongue 72 arranged so as to form with the first tongue a slot by which the said shoe can be engaged on the ring 17.

According to the form of construction shown in FIGS. 7 to 9, the operating unit 13 is formed by a simple section of tube, the internal surface of which (see FIG. 8) is hollowed out with grooves 80 serving as a housing for sealing joints, and grooves 81 permitting the fitting of the dust-tight joints 83. The machining of this tubular section is therefore very small. On its outer surface is fixed, for example by welding, a substantially semi-circular fixing flange 82.

This flange 82 which is made by simply cutting-out a metal plate, is provided laterally with two lugs 85A, 85B by which the operating unit 13 is fixed to the support 10 by means of screws 65A, 65B respectively.

At the level of the lugs 85A, 85B, the flange 82 is backed by plates 87A, 87B which have especially the purpose of transferring axially, in the direction of the disc 12, the support of the flange 82 on the fixed support 10, beyond the corresponding extremity of the section of tube 13, so as to permit a suitable outlet for the piston 15.

This application of the fixing flange 82 against the fixed support 10 is effected by means of flats 88A, 88B respectively, machined on the side-plate 20 of the fixed support 10, and limited by flats 110A, 110B perpendicular to those preceding and therefore to the plane of the disc.

As described with reference to FIGS. 1 to 6, the transfer ring 17 is subjected to the action of elastic means which urge it in a direction radial to the disc 12, from the centre of this latter to its periphery, and supporting surfaces are conjointly provided for the radial maintenance of this ring in this direction.

Two of these radial supporting surfaces are arranged on the other side of the disc 12 with respect to the operating unit 13 and are formed by tongues 90A, 90B suitably cut-out and bent in the supporting plate 40' of the brake-shoe 11'.

According to the present alternative form, on the same side of the disc 12 as the operating unit 13, a radial supporting surface is formed on the piston 16 by an overhanging projection 91 which is arranged on the outer surface of this piston, and the lower face of which is perpendicular to the plane of the disc.

Thus, all these radial supporting surfaces against which the transfer ring 17 is applied by the associated elastic means described below, are movable perpendicularly to the plane of the disc 12 and are thus able to follow in operation the corresponding movements of the said transfer ring 17.

Furthermore, and according to the present alternative, the elastic means which act on the transfer ring 17 in the direction of the periphery of the disc 12 are formed by two torsion springs 95A, 95B fixed to the side-plate 20 of the support 10 by screws 96A, 96B respectively.

Each of these springs comprises a helicoidal portion 97A, 97B by which it is engaged on the associated screw 96A, 96B, an end hook 98A, 98B, in contact with the transfer ring 17 and an end hook 99A, 99B supported against the corresponding edge of the side-plate 20 of the fixed support 10.

The guiding of the transfer ring 17 perpendicularly to the plane of the disc 12 is effected on the one hand by two generator lines 101A, 101B of the operating unit 13, and on the other hand by the extreme edges 102A, 102B of the fixed support (see FIG. 7); one only of these guiding methods may be furthermore sufficient, in an alternative form.

The operation of such a brake is similar in all respects to that described above.

It is only necessary to emphasize that the movements during operation of the transfer ring perpendicularly to the plane of the disc only result in very slight friction.

It should also be noted that the assembly of the operating unit is facilitated by the flats 110A, 110B of the side-plate 20 of the fixed support 10, on which flats the corresponding edge of the flange 82 is supported.

It will also be observed that during dismantling of the brake, the detail of which has been given above, the springs 95A, 95B apply their action on the transfer ring 17 only as long as they do not come into contact by their arms 98A, 98B with the lateral edges 102A, 102B of the fixed support 10, which facilitates this dismantling.

It will finally be noted that, as described above with reference to FIGS. 1 to 6, the radial support of the transfer ring 17 is effected at three points on this ring, but that, as described in the present alternative form, one of these points 91 is on the side of the operating unit 13 with respect to the disc 12, whereas two of these points 90A, 90B are on the opposite side.

In FIGS. 10 to 13 there is shown another alternative form of a disc-brake of the same type as that described above. This brake comprises: a fixed support 110, two brake-shoes 11, 11' on each side of a disc 12 fixed to the wheel to be braked, an operating unit 13 provided laterally with two lugs 14A, 14B for its removable fixing on the support 110 by means of screws 65A, 65B, this unit (see FIG. 13) being pierced with a bore in which two pistons 15, 16 are mounted to slide in opposite directions, and an annular transfer member 117 which extends perpendicularly to the plane of the disc 12, around the operating unit 13, the support 110 and the brake-shoes 11, 11'.

This transfer member or ring 117 is a flat piece formed from a metal plate; it comprises locally however two stamped portions 118A, 118B on each side of the support 110, in the immediate proximity of this latter, these stamped portions being provided so as to permit the passage of the disc 12. They contribute by their edges in the axial guiding of the ring 117.

The piston 15 bears on the brake-shoe 11 while the piston 16 acts on the ring 117 which is in turn intended to act on the brake-shoe 11' in a manner which will be described later.

The support 110 is a bracket-shaped member comprising a side-plate 120 parallel to the plane of the disc 12, and a return member 121 perpendicular to the side-plate 120 facing the periphery of the said disc.

According to the invention, and in conformity with the form of embodiment shown in FIGS. 10 to 13, the side-plate 120 and the return member 121 of the support 110 are made from a single piece of sheet metal, suitably cut-out, bent and stamped.

The side-plate 120 is provided, facing the operating unit 13, with a window 123 having a closed contour and serving as a housing for the brake-shoe 11.

As can be more clearly seen from FIGS. 14 and 15, in which the support 110 is shown separately, the side-plate 120 of this support is reinforced by two plates 110A, 110B on each side of its window 123. These reinforcing plates 110A, 110B are fixed on the side-plate 120 by resistance welding at 111.

The reinforcing plates 110A, 110B form part of the periphery of the window 123 and this periphery is provided here and there with flat bearing surfaces 125 formed conjointly by the side-plate 120 and the reinforcing plates 110A, 110B for supporting the associated brake-shoe 11.

At its lower portion, the side-plate 120 is provided with two fixing lugs 122A, 122B backed by reinforcing plates 110A, 110B respectively.

On each side of the window 123, the reinforcing plates 110A, 110B are provided with supporting studs 112A, 112B respectively.

The supporting studs 112A, 112B are each constituted by a solid pillar having an oblique chamfer at one extremity and a stop-flange 114 at the other extremity, which projects from the side. By its chamfer, a supporting stud 112A, 112B of this kind is fixed by welding on the corresponding reinforcing plate 110A, 110B, which is provided with a housing for that purpose.

With each supporting stud 112A, 112B is associated a punched portion 217A, 217B which can be seen from FIG. 14. This punched portion 217A, 217B is formed in the corresponding reinforcing plate 110A, 110B and, as will be seen later, is intended to constitute a stop member.

There are further provided other punched portions of this type, formed conjointly and in a complementary manner in the side-plate 120, on the one hand, and the reinforcing plate 110A, 110B on the other hand, in particular for the centering of the said plates on the side-plate 120. Punched portions of this kind can be seen at 118A, 118B in FIG. 15, and at 119A, 119B in FIG. 14. As will be seen subsequently, the punched portions 119A, 119B are also intended to serve as stop members.

At its upper portion, at the root of the return member 121, the side-plate 120 has threaded bores 162A, 162B intended to co-operate with the screws 65A, 65B which serve to fix the operating unit 13 (see FIG. 10). These threaded bores 162A, 162B, extend into the corresponding reinforcing plates 110A, 110B, and for sufficient contact of the side-plate 120 with the reinforcing plates 110A, 110B all round the said bores, this side-plate 120 is provided on its inner face, that is to say that located under the return member 121, with punched flats 130A, 130B, by means of which the bores shown in FIG. 15 are arranged.

Perpendicularly to the side-plate 120, the return member 121 has a generally cylindrical shape. At its central portion it comprises an extension 132, the lateral edges of which form transverse support abutments 136A, 136B for the circumferential retention of the brake-show 11', in both directions of rotation of the disc 12.

In addition, the return member 121 is provided perpendicular to the side-plate 120, with two flats 137A, 137B for the radial retention of the brake-shoe 11' in one radial direction of the disc 12.

As described above with reference to FIGS. 1 to 9, elastic means are inserted between the fixed support 110 and the transfer ring 117, and elastic means are also provided in order to absorb possible vibrations to which the brake-shoe 11 may be subjected in its housing 123.

According to the present alternative form, these two categories of elastic means are conjointly formed by springs 140A, 140B, acting between the transfer ring 117 and the brake-shoe 11, while being supported on the supporting studs 112A, 112B.

According to the form of embodiment shown, these springs are torsion springs made from round wire suitably bent and comprising a central portion 141A, 141B respectively and two lateral arms 142A, 143A and 142B, 143B elbowed at their extremities.

By their central portions 141A, 141B, the springs 140A, 140B are freely engaged on the supporting studs 112A, 112B, the internal diameter of the said central parts being to that end greater than the diameter of the radial flange 114 of these studs.

By their elbowed lateral branches 142A, 142B, the torsion spring 140A, 140B are in elastic contact with the transfer ring 117 and by their elbowed lateral edges 143A, 143B, they are elastically in contact with the lower edge of the brake-shoe 11, by virtue of cut-away portions 144A, 144B provided in the window 123 of the support 110, between two bearing surfaces 125.

As can better be seen from FIG. 12, the central portions 141A, 141B of these springs bear against the corresponding supporting studs 112A, 112B by a generator line of this latter, so that the torsion springs 140A, 140B are thereafter blocked longitudinally on the said studs 112A, 112B by the radial flanges 114 of these latter.

The metal plate 40' which supports the friction lining of the brake-shoe 11' is provided with two lateral extensions 42A, 42B which enclose the central part 132 of the return member 121 of the support 110 (see FIGS. 10 and 11. These extensions 42A, 42B co-operate respectively with the transverse support abutments 136A, 136B formed on this return member 121.

In addition, the metal plate 40' of the brake-shoe 11' (see FIG. 11) forms in the vicinity of these extensions 42A, 42B, supporting surfaces 50A, 50B which co-operate with longitudinal support abutments 137A, 137B formed on the return member 121 of the support 110.

The friction lining of the brake-shoe 11' is divided into two parts 41A, 41B arranged on each side of a free ventilation space.

As shown in FIG. 10, the transfer ring 117 bears against the plate 40' of the brake-shoe 11' by two distinct supporting zones 150A, 150B, each corresponding respectively to the friction linings 41A, 41B. These supporting zones 150A, 150B are shown in fine cross-hatching in FIG. 11.

In the plate 40' of the brake-shoe 11' a tongue 52 is also cut-out (FIGS. 10, 11 and 13) and this tongue is bent so as to bear by its free edge 53 against the transfer ring 117, following an arrangement which, described in detail above, ensures the radial retention of the brake-shoe 11' together with the longitudinal support abutment 137A, 137B of the return member 121 of the support 110, and conjointly with the torsion springs 140A, 140B.

As has already been mentioned above, the operating unit 13 is provided with two lateral lugs 14A, 14B for its fixing on the support 110.

As can better be seen from FIG. 12, these lugs are extended by bosses 114A, 114B respectively, intended to come into contact with the stop members 119A, 119B carried by the reinforcing plates 110A, 110B of the support 10 during the assembly of the operating unit 13 on this support.

During the assembly of the brake, this arrangement enables the placing in position, without trial and error of the screws 65A, 65B which ensure the fixing of the operating unit 13 on the support 10.

At its rear portion, the operating unit 13 is provided with bearing surfaces at right angles formed at the lower surface of longitudinal beads 68A, 68B formed laterally on the operating unit, so as to retain the ring 117 as described below, and also for guiding this ring perpendicularly to the plane of the disc 12.

The transfer ring 117 rests elastically on the lateral arms 142A, 142B of the torsion springs 140A, 140B, and is engaged on the one hand under the lateral beads 68A, 68B of the operating unit 13 and on the other hand under the tongue 52 of the brake-shoe 40'.

This arrangement ensures the retention of the transfer member 117 and this latter transmits in its turn to the brake-shoe 11' the elastic force which is applied to it by the torsion springs 140A, 140B, which ensures the application of the said shoe against the return member 120 of the fixed support 110.

The operation of the brake described above is the same as that of the previous construction.

Changing of the brake-shoes 11, 11' is effected by removing the operating unit 13 from the support 110 by unscrewing and removing the screws 65A, 65B, without it being necessary to disconnect the hydraulic circuit associated with the operating unit; access is thus obtained to the brake-shoe 11. In order to obtain access to the brake-shoe 11', it is only necessary to push back the transfer ring 117 until this ring escapes from the tongue 52 of the said shoe.

After dismantling, the stop members 217A, 217B associated with the supporting studs 112A, 112B carried by the reinforcing plates 110A, 110B of the support 110 limit the movement of rotation of the corresponding arms 143A, 143B of the torsion springs 140A, 140B, which facilitates subsequent re-assembly of the brake.

This re-assembly is effected by placing in position the operating unit 13, also facilitated, as has been seen by the sto members 119A, 119B carried by the reinforcing plates 110A, 110B of the support 110. This placing in position is effected against the force of the torsion springs 140A, 140B which must be slightly acted upon in torsion.

The present invention is of course not restricted to the forms of construction described and shown, but includes any alternative form of construction and/or of combinations of their various parts.

What we claim is:

1. A disc-brake comprising a generally right-angle dihedral-shaped fixed support, a rotatable disc fixed to a member to be braked, a pad mounted for movement perpendicular to the plane of the disc on each side thereof, a control unit and a ring-like transfer member mounted for movement perpendicular to the disc, said control unit including a cylinder and two pistons mounted for sliding movement in opposite directions in said cylinder, one of said pistons acting directly on a first pad and the other of said pistons acting indirectly on the second pad through the intermediary of said transfer member, said ring-like transfer member extending around said fixed support, the control unit, the pads and a portion of said disc, said generally right-angle dihedral-shaped fixed support comprising a plate member parallel to the disc and a positioning member perpendicular to the disc radially outward of and having its radially inner surface facing the edge of the disc, said plate member and said positioning member being fixed relative to each other, said plate member having a surface facing the control unit and including a frame portion for limiting the movement of the first pad in both directions of rotation of the disc and in at least one radial direction, said positioning member including at least one longitudinal support abutment for radially retaining the second pad relative to the disc, at least two transverse support abutments for limiting the movement of the second pad in both directions of rotation of said disc, and transverse support abutments being disposed at the ends of said positioning member, two lateral extensions on said second pad and being disposed on opposite sides of said positioning member for contacting said transverse support abutments, said transfer member having a radially outwardly directed supporting surface that faces the positioning member, said second pad having two opposed support surfaces one of which contacts said transfer member supporting surface and the other of which contacts said longitudinal support abutments on said positioning member, said surfaces and abutments extending transversely of the plane of said disc and said support surfaces extending transversely of a radius of said disc that passes through said support surfaces, and resilient means between said transfer member and said fixed support urging said transfer member radially outwardly, the positioning member and the transfer member resiliently gripping the second pad radially between themselves.

2. A disc-brake as claimed in claim 1, in which said second pad includes a metal support plate with a friction lining, said supporting surfaces in cooperation with the transfer member being formed by the edge of at least one cut-out, bent tongue in said plate.

3. A disc-brake as claimed in claim 1, and further comprising radial support surfaces associated with said transfer member and adapted to retain said transfer member radially in at least one direction, said radial support surfaces being movable perpendicular to the plane of said disc, such that during braking said radial support surfaces follow the movements of said transfer member without friction.

4. A disc-brake as claimed in claim 3, in which at least one of said radial support surfaces associated with said transfer member is formed on the piston of said control unit which acts on said transfer member.

5. A disc-brake as claimed in claim 3, in which said radial support surfaces associated with said transfer member are formed on said second pad on one side of said disc and on the piston acting on said transfer member on the other side of said disc.

6. A disc-brake as claimed in claim 5, in which the piston acting on said transfer member is provided with an overhanging projection for the radial support of said transfer member, the lower face of said overhanging projection being directed towards the axis of said disc being perpendicular to the plane of said disc.

7. A disc-brake as claimed in claim 1, in which said resilient means interposed between said transfer member and said fixed support comprises at least one torsion spring having a helical portion engaged on a securing member secured to said support, an end hook engaging said transfer member and an end hook engaging said fixed support.

8. A disc-brake as claimed in claim 1, in which said generally right-angle dihedral-shaped fixed support is formed of a single piece.

9. A disc-brake as claimed in claim 1, in which said fixed support carries two support studs, one on each side of the frame portion of said first pad for supporting resilient torsion means interposed between said first pad and said transfer member.

10. A disc-brake as claimed in claim 9, in which each stud carries a torsion spring received on said stud and having two lateral arms, onee lateral arm being in contact with said first pad and the other lateral arm being in contact with said transfer member.

11. A disc-brake as claimed in claim 10, and further comprising a stop member associated with each said support stud, said stop member projecting from the fixed support so as to limit the travel of at least one of the arms of the associated spring.

* * * * *